United States Patent
Majumdar et al.

(10) Patent No.: US 11,318,423 B2
(45) Date of Patent: *May 3, 2022

(54) PROCESSES FOR SEPARATION OF AROMATIC COMPOUNDS USING A THIN FILM COMPOSITE MEMBRANE

(71) Applicant: Compact Membrane Systems, Inc., Newport, DE (US)

(72) Inventors: Sudipto Majumdar, Newark, DE (US); Ning Shangguan, Cherry Hill, NJ (US); Robert Daniel Lousenberg, Wilmington, DE (US); Kenneth Evan Loprete, Philadelphia, PA (US)

(73) Assignee: Compact Membrane Systems Inc., Newport, DE (US)

( * ) Notice: Subject to any disclaimer, the term of this patent is extended or adjusted under 35 U.S.C. 154(b) by 78 days.

This patent is subject to a terminal disclaimer.

(21) Appl. No.: 16/846,960

(22) Filed: Apr. 13, 2020

(65) Prior Publication Data
US 2020/0238224 A1 Jul. 30, 2020

Related U.S. Application Data

(63) Continuation-in-part of application No. 16/381,333, filed on Apr. 11, 2019, now Pat. No. 10,639,591.
(Continued)

(51) Int. Cl.
*B01D 69/12* (2006.01)
*B01D 69/02* (2006.01)
(Continued)

(52) U.S. Cl.
CPC ......... *B01D 69/125* (2013.01); *B01D 53/228* (2013.01); *B01D 69/02* (2013.01);
(Continued)

(58) Field of Classification Search
None
See application file for complete search history.

(56) References Cited

U.S. PATENT DOCUMENTS

| 5,191,151 A | 3/1993 | Eriksen et al. | |
| 5,670,051 A * | 9/1997 | Pinnau | B01D 53/228 |
| | | | 210/500.27 |

(Continued)

OTHER PUBLICATIONS van Zyl et al., A.J., "Influence of oxygen-containing hydrocarbons on the separation of olefin/parrafin mixtures using facilitated transport", Journal of Membrane Science, 133, 1997, pp. 15-26. (Year: 1997).

(Continued)

*Primary Examiner* — Jason M Greene
(74) *Attorney, Agent, or Firm* — Devlin Law Firm LLC; James M. Lennon (57) ABSTRACT

This invention discloses a method for separation of an aromatic compound from a mixture comprising an alkane using an improved thin-film composite membrane. The membrane is particularly useful for separation of benzene from cyclohexane, which have similar boiling points. The membrane comprises a more mechanically durable and defect-free separation layer as a result of its fabrication from an ionomer solution that is substantially free of dissolved ionic species not associated with the ionomer.

12 Claims, 2 Drawing Sheets

Related U.S. Application Data (60) Provisional application No. 62/789,276, filed on Jan. 7, 2019.

(51) Int. Cl.
  *B01D 53/22* (2006.01)
  *B01D 71/36* (2006.01)
  *B01D 71/82* (2006.01)
  *B01D 67/00* (2006.01)
  *B01D 69/10* (2006.01)

(52) U.S. Cl.
  CPC ............. *B01D 71/36* (2013.01); *B01D 71/82* (2013.01); *B01D 67/0093* (2013.01); *B01D 69/10* (2013.01); *B01D 2257/702* (2013.01); *B01D 2323/08* (2013.01); *B01D 2323/30* (2013.01); *B01D 2325/04* (2013.01); *B01D 2325/20* (2013.01)

(56) References Cited

U.S. PATENT DOCUMENTS

| | | | | |
|---|---|---|---|---|
| 10,639,591 | B1 * | 5/2020 | Lousenberg | .......... B01D 69/12 |
| 2006/0223894 | A1 | 10/2006 | Ghielmi et al. | |
| 2010/0319535 | A1 | 12/2010 | Joshi et al. | |
| 2015/0025293 | A1 | 1/2015 | Feiring et al. | |
| 2016/0045859 | A1 | 2/2016 | Zhang et al. | |
| 2018/0085714 | A1 | 3/2018 | Shangguan et al. | |
| 2018/0111098 | A1 | 4/2018 | Majumdar et al. | |
| 2018/0134638 | A1 | 5/2018 | Koizumi | |

OTHER PUBLICATIONS

"Aquivion(R) PFSA", 12 pages, retrieved from https://www.solvay.com/en/brands/aquivion-pfsa on Jul. 24, 2019. (Year: 2019).

J. Catalano, et al., "The effect of relative humidity on the gas permeability and swelling in PFSI membranes," Intl. Journal of Hydrogen Energy, 37 (2012), pp. 6308-6316. O.I. Eriksen, et al., Facilitated transport of ethene through Nafion membranes. Part 1. Water swollen membranes, Journal of Membrane Science, 85 (1993), pp. 89-97.

A.J. van Zyl, et al., "Application of new sulfonated ionomer membranes in the sepration of pentene and pentane by facilitated transport," Journal of Membrane Science, 137 (1997), pp. 173-185.

T.J. Thomas, et al., "Effects of annealing on mixture-cast membranes of Nafion and quaternary ammonium brimide salts," Journal of Membrane Science, 213 (2003), pp. 55-66.

T. Kitano, et al., "Conformation of Polyelectrolyte in Aqueous Solution," Macromolecules, 13 (1) (1980), pp. 57-63.

O.I. Eriksen, et al., Facilitated transport of ethene through Nafion membranes. Part I. Water swollen membranes, Journal of Membrane Science, 85 (1993), pp. 89-97.

* cited by examiner

PROCESSES FOR SEPARATION OF AROMATIC COMPOUNDS USING A THIN FILM COMPOSITE MEMBRANE

CROSS REFERENCE TO RELATED APPLICATIONS

This application is a continuation application of U.S. patent application Ser. No. 16/381,333, filed on Apr. 11, 2019, which claims the benefit of priority to U.S. Provisional Patent Application No. 62/789,276, filed on Jan. 7, 2019, the disclosures of which are incorporated by reference herein in their entireties.

GOVERNMENT RIGHTS

This invention was made with government support under DE-SC0007510 awarded by the Department of Energy. The government has certain rights in the invention.

FIELD OF THE INVENTION

A process for separation of an aromatic compound from a mixture comprising an alkane using a thin-film composite membrane that has one or more separation layers of a certain type of ionomer is disclosed.

BACKGROUND

Industrial separations of alkenes or certain aromatic compounds from alkanes by traditional methods such as distillation can be challenging due to their low and often similar boiling points. Notably challenging are separations of compounds having the same number of carbon atoms, such as ethylene from ethane, propylene from propane, and benzene from cyclohexane. Similar boiling points necessitate large-scale capital-intensive facilities and high energy input for effective separation, which may involve cryogenic or extractive distillation conditions. Membrane separation processes may be less expensive and require significantly less energy. Thin-film composite membranes that incorporate ionomers may be used for facilitated transport of alkenes or aromatic compounds.

Fluorinated polymers are known for their resistance to chemical and thermal degradation in demanding industrial applications. Membranes comprising separation layers of fluorinated polymers that are also ionomers, have been shown to be useful for the separation of organic compound mixtures such as alkenes from alkanes, alkenes from other non-hydrocarbon gases, and benzene from cyclohexane. One might assume that at a minimum a membrane consisting solely of a separation layer of a fluorinated ionomer would be useful. However, fluorinated ionomers can be costly and the flux, which is the rate at which permeating species pass through the membrane per unit area, would be impractically low for a necessarily thick membrane that is mechanically strong. A membrane composite can overcome these limitations and usually comprises a thin separation layer and other layers of dissimilar materials contacted together in combination to form a single composite construction that optimize and improve the composite membrane performance and durability. The use of various membranes and reinforced composites that may comprise a separation layer of a silver ionomer for facilitated transport of alkenes or aromatic compounds have been described. See for example S. T. Kao et al. in *Desalination* 2002 149 35-40, A. van Zyl et al. in *Journal of Membrane Science* 1997 133 15-26, O. I. Eriksen et al. in *Journal of Membrane Science* 1993 85 89-97, A. van Zyl *Journal of Membrane Science* 1997 137 175-185, and U.S. Pat. No. 5,191,151.

Eriksen et al. in U.S. Pat. No. 5,191,151 disclosed composite membranes for the separation of alkenes from alkanes. The composite membranes comprised separation layers of perfluorinated ionomers that were copolymers of tetrafluoroethylene and a perfluorovinyl ether monomer containing a terminal sulfonate group, such as Nafion® (Chemours, Wilmington Del.). In the third embodiment of the invention therein, the sulfonic-acid form of the ionomer, as 5% solutions in lower alcohols/water, were modified by mixing with at least one silver compound under such conditions to obtain a solution comprising an equilibrium mixture of the silver-exchanged ionomer and the conjugate acid of the anion from the silver compound. Highly soluble and "ionizable" silver compounds such as $AgBF_4$, $AgClO_4$, and $AgNO_3$ (preferred) were used at ratios of g-equivalents of silver to g-equivalents of sulfonic-acid groups (present in the ionomer) in the range of 0.5:1 to 50:1, preferably at about 1:1 to stoichiometric excesses of about 40:1. Membranes with thicknesses from 0.1 to 400-μm were disclosed and composite membranes I and J, having 20 and 30-μm thicknesses, respectively, were enabled in example 5 by casting on and into porous-layer supports having 0.2-μm average pore diameters. The membranes were presumably interpenetrating composites due to the relatively large pores of the supports.

As taught by Eriksen et al., we attempted to fabricate laminar composite membranes with significantly (≥10×) thinner (≤2-μm) separation layers for anticipated commercially-attractive higher permeance and lower costs. Ionomer solutions were prepared by dilution of commercially available Nafion® D2020, with added dissolved salts such as silver nitrate, and membranes were quantitatively cast on polyvinylidine fluoride porous-layer supports having order-of-magnitude smaller pore diameters of approximately 0.02-μm. Gas testing indicated that many of these composite membranes were defective and had low or no alkene over alkane selectivity due to suspected pore penetration and "pinholes". The defective membranes had excessively high helium permeability that was likely due to incomplete pore-bridging of the support and a mechanically fragile gas-separation layer. We recognized that membranes cast from mixtures of ionomer and dissolved ionic compounds, not associated with the ionomer, can be inherently fragile due to poor and incomplete film coalesce. See for example S. D. Minteer et al. in *Journal of Membrane Science* 2003 213 55-66. Such prepared membranes are not very mechanically durable and cannot be easily and consistently fabricated defect-free into larger, more complex, and commercially relevant geometries such as spiral-wound membrane modules.

SUMMARY OF THE INVENTION

This invention discloses a method for separating an aromatic compound from a mixture comprising an alkane using an improved thin-film composite membrane; the method comprising the following steps of:
1. providing a thin-film composite membrane having a feed side and a permeate side; the thin-film composite membrane comprising:
   a) a substrate comprising a porous-layer support; and
   b) a separation layer comprising an ionomer comprising sulfonate groups, selected from: silver sulfonate, sulfonic acid, or non-silver sulfonate; said separation layer is predominantly laminar, in direct contact to said substrate, and substantially free of ionic species not associated with the ionomer;
2. exposing the feed-side to a flowing first mixture comprising an aromatic compound and an alkane; and
3. providing a driving force and producing a flowing second mixture at the permeate-side having a higher concentration of aromatic compound to alkane than the flowing first mixture at the feed-side.

The thin-film composite membrane herein was demonstrated to be useful for the separation of alkenes from feed mixtures comprising alkanes or non-hydrocarbon gas such as helium, hydrogen, nitrogen, oxygen, and argon. It was subsequently discovered that the thin-film composite membrane was also useful for the separation of aromatic compounds, such as benzene, from feed mixtures comprising alkanes such as cyclohexane. The membrane incorporates an improved separation layer that is predominantly laminar, mechanically stronger, and more defect-free, as a result of its fabrication from an ionomer solution that is substantially free of dissolved ionic species not associated with the ionomer. That is, there are no or minimal amounts of other ionic species present with the ionomer in solution at concentrations that may adversely affect coalescence and film formation of the separation layer. Consequently, the separation layer is also substantially free of ionic species not associated with the ionomer and predominantly laminar. The separation layer can appear shiny and transparent and a subtle light interference "rainbow" effect, which can be observed for certain thicknesses, was additional evidence for its laminar nature.

Pore bridging of a substrate comprising a porous-layer support by the ionomer to form the predominantly laminar separation layer is also improved in the absence of other dissolved ionic species not associated with the ionomer in solution. More specifically, the ionomer reduced viscosity which correlates with molecular size in solution, is maximized with minimal or no other concentrations of dissolved ionic species. This is likely due to increased double layer forces and charge repulsion along the ionomer chain, which causes the chain to adopt a more expanded conformation in solution. See for example T. Kitano et al. in *Macromolecules* 1980 13 (1) 57-63, which is hereby incorporated by reference. It was also discovered that certain perfluorinated ionomers were highly advantageous for formation of the separation layer. For example, Aquivion® (Solvay, Houston Tex.) having a 720 equivalent weight had the highest measured reduced viscosity for commercially available materials. This stronger thin-film composite membrane can be fabricated into complex and commercially relevant geometries, such as spiral-wound membrane modules that have large surface areas.

Formation of a more defect-free and predominantly laminar separation layer in the thin-film composite membrane was evidenced by helium permeability where the measured mean permeability was less than two times greater and close to the known intrinsic helium permeability for the gas-separation layer material. For example, Nafion® and Aquivion® both have intrinsic helium permeably between 18 and 27-Barrer at 25° C. to 35° C., respectively, under dry conditions. The permeability were measured using thick films (160 and 153-μm) of the sulfonic-acid ionomers. See for example, J. Catalano et al. in *International Journal of Hydrogen Energy* 2012 37 6308-6316 for Nafion® and Aquivion® intrinsic permeability and which is hereby incorporated by reference. Furthermore, helium permeability distributions herein calculated from measurements of multiple separate samples of the composite membranes were relatively narrow whereas the distributions for composite membranes prepared as taught by Eriksen et al. were much broader and shifted to higher mean permeability that was at least two times greater than the intrinsic permeability due to a higher defect rate.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention. Herein certain terms are used and they are further defined in the description of the invention:

BRIEF DESCRIPTION OF THE DRAWINGS

The accompanying figures are included to provide a further understanding of the invention and are incorporated in and constitute a part of this specification. The figures illustrate embodiments of the invention and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Furthermore, the figures are not necessarily to scale and some features may be exaggerated to show details of particular components. Also, specific structural and functional details disclosed herein are not to be interpreted as limiting, but merely as a representative basis for teaching one skilled in the art to variously employ the present invention.

DETAILED DESCRIPTION OF THE INVENTION

Ionomers are useful materials for formation of the separation layer of the thin-film composite membrane used in the invention. An ionomer is a copolymer that contains covalently-bound ionic-pendant groups such as sulfonic acid, sulfonate, carboxylic acid, carboxylate, phosphate, phosphonium, or ammonium. The ionomer equivalent weight is the weight of ionomer containing one mole of sulfonate group. The ionomer equivalent weight (EW) is preferably less than 5000 grams per mole, more preferably less than 2000, and very preferably between 500 and 800-g/mole. Ionomers that are copolymers containing sulfonic acid or sulfonate groups are preferred ionomers useful for fabrication of the separation layer. Such ionomers are well known in the art, and in some instances are known to separate alkenes from alkanes or aromatic compounds from alkanes. See for examples S. T. Kao et al. in *Desalination* 2002 149 35-40, A. van Zyl et al. in *Journal of Membrane Science* 1997 133 15-26, O. I. Eriksen, et al. in *Journal of Membrane Science* 1993 85 89-97, A. van Zyl, *Journal of Membrane Science* 1997 137 175-185, and U.S. Pat. No. 5,191,151, all of which are hereby incorporated by reference.

The preferred ionomers comprise repeat units A and B in which A is a polymerized derivative of a fluorinated monomer and B comprises sulfonate groups. The ionomers preferably contain 50% or more carbon-fluorine groups to carbon-fluorine groups plus carbon-hydrogen groups. More preferred ionomers are fluoropolymers in which there are no carbon-hydrogen groups in the polymer-backbone repeating units. Examples of the latter ionomers include copolymers comprising polymerized repeat units of tetrafluoroethylene and a perfluorovinyl ether monomer, having a pendant sulfonate group such as for example Nafion® (Chemours, Wilmington Del.), and Aquivion® (Solvay, Houston Tex.).

The separation layer is fabricated from an ionomer solution that is substantially free of other dissolved ionic species that are not associated with the ionomer. Other ionic (cationic or anionic) species that are not associated with the ionomer comprise an ion where the counter ion is not covalently bound to the ionomer. A substantially-free ionomer solution has concentrations of other cationic species at molar ratios to ionomer sulfonate-groups ($-SO_3$) that are between 0 and less than 0.37, which is also less than the equivalent minimum 0.5:1 ratio of g-equivalents of silver (from the added silver compound) to g-equivalents of $-SO_3$ groups as disclosed in U.S. Pat. No. 5,191,151. The substantially-free ionomer solution may comprise more than one type of ionomer, or associated counter ions. For example, an ionomer solution comprising covalently bound sulfonate groups may have associated counter ions that are different from silver (i.e. non-silver sulfonate) such as for example $H^+$, $Li^+$, $Na^+$, $K^+$, ammonium, alkyl ammonium, or mixtures therefrom. The counter ions may also be changed through an equilibrium exchange process after fabrication of the separation layer in the thin-film composite membrane.

Sulfonic-acid, lithium-sulfonate, or silver-sulfonate ionomer solutions that have trace or zero concentrations of other dissolved ionic species not associated with the ionomer are preferred ionomer solutions for fabrication of the separation layer. Furthermore and for example, such a solution comprising a lithium sulfonate, or silver-sulfonate ionomer may be prepared from the sulfonic-acid ionomer solution by mixing with an essentially insoluble lithium, or silver compound such as lithium carbonate or silver carbonate, respectively, to effect a heterogeneous acid-base reaction to form the lithium or silver sulfonate ionomer solution, carbon dioxide, and water. The reaction is effectively complete when insoluble carbonate is no longer consumed, $CO_2$ bubbles are no longer generated, and the solution pH is to wet pH paper. Any excess insoluble carbonate may be separated from the ionomer solution by techniques such as filtration or centrifugation. The lithium-sulfonate ionomer solution is indefinitely stable while the silver-sulfonate ionomer solution is stable for weeks to months at room temperature if properly stored in the absence of light.

The ionomer solution that is substantially free of other dissolved ionic species not associated with the ionomer may be diluted with a solvent or solvent mixture to a more desirable concentration prior to silver-sulfonate formation or separation layer fabrication. Suitable solvents or solvent mixtures are those that dissolve the ionomer and evaporate at an appropriate rate to form the gas-separation layer in a timely manner. For example, suitable solvents include but are not limited to lower alcohols such as ethanol, isopropanol, n-propanol, certain ketone, ether, amide, and ester solvents, and mixtures therefrom. Certain mixtures of the preceding solvents with fluorinated solvents such as Novec® HFE7200, and HFE7300 are also suitable. Ionomer concentrations that are less than 5% are preferred for separation layer fabrication, more preferably 2% or less.

Solution casting is a preferred membrane fabrication technique to form the separation layer of the thin-film composite membrane. Preferred solution casting techniques include but are not limited to ring casting, dip-coating, spin-coating, slot-die coating, and Mayer-rod coating. The ionomer solution is cast onto a substrate comprising a porous-layer support and the solvent(s) are evaporated to form the "dry" separation layer. Residual or trace solvent remaining in the separation layer should not interfere with subsequent processing steps. The separation layer thickness has a significant influence on the membrane cost and productivity of the separation process per unit area. The separation layer is thin and its thickness is preferably 0.01-µm to 5-µm, more preferably 0.1-µm to 2-µm, and most preferably 0.5-µm to 2-µm. The separation layer thickness is optimized such that both the permeance through the thin-film composite membrane and selectivity over other permeating species is high per unit area. Gas permeance or GPU has units of $10^6 \times cm^3$ (STP)/$cm^2$/sec/cmHg while permeability, which is normalized for thickness and reported in Barrer, has units of $10^{10} \times cm^3$ (STP)$\times cm/cm^2$/sec/cmHg.

The substrate comprising the porous-layer support may be in the form of a flat sheet, hollow fiber, or tube. The porous-layer support reinforces the thin separation layer and helps to further mechanically strengthen the thin-film composite as a whole such that the membrane may be fabricated into more complex geometries such as spiral-wound or hollow-fiber membrane modules. The substrate comprising the porous-layer support may also comprise an even stronger backing material such as porous non-woven polyester or polypropylene. Suitable porous-layer support materials include but are not limited to polyvinylidine fluoride, expanded polytetrafluoroethylene, polyacrylonitrile, polysulfone, and polyethersulfone. Porous inorganic substrates such as porous silica or alumina are also suitable support materials. Permeating species should flow relatively unobstructed through the usually much thicker porous-layer support having a preferred porosity that is 40% or greater. The porous-layer support average pore size is preferably less 0.1-µm and more preferably between 0.01 and 0.03-µm.

The thin-film composite membrane is a predominantly laminar composite with the separation layer being in direct contact with the substrate comprising the porous-layer support. The separation layer is predominantly laminar in that at least 50% to 99.9% of the separation-layer is not interpenetrating the pores of the substrate. The separation layer cannot be easily separated from the substrate and may be mechanically locked to the substrate by the 0.1% to less than 50% that is interpenetrating the pores. In contrast, more than 50% of the separation layer in a "predominantly interpenetrating" composite would be within the substrate. The separation layer surface and interface with the substrate would be highly irregular, with the separation layer penetrating the substrate to an extent that it may not be easily distinguishable as a separate layer.

The separation layer in the thin-film composite membrane may be subjected to a thermal treatment step "annealed" to further improve mechanical durability, long-term and consistent permeance and selectivity, and resistance to degradation from contact with liquid water. The ionomer in the separation layer may be annealed by heating the thin-film composite membrane to near or above the glass transition temperature of the ionomer. The exact glass transition temperature will be dependent on the ionomer composition and the associated counter ion. Generally, annealing temperatures are between 50 and 200° C., and preferably between 50 and 150° C. The separation layer is preferably heated for 0.1 to 10 minutes, more preferably for 1 to 5 minutes. The appropriate annealing temperature and time should not degrade the other components of the thin-film composite membrane.

The separation layer comprising silver-sulfonate, sulfonic-acid, or non-silver sulfonate groups, is perm-selective for separation of an aromatic compound from an alkene. However, sulfonic-acid and non-silver sulfonate groups are not significantly perm-selective for alkenes over alkanes (selectivity 5) for example and the alkene permeance is low (<25-GPU). The non-silver cations in the thin-film composite membrane may be exchanged for silver or different cations. For example, it was discovered that silver exchange without damage to the thin separation layer may be carried out by contacting the exposed separation layer surface with a solution comprising water and a soluble silver compound such as silver nitrate. It was discovered that a sufficient level of exchange quickly occurred for a thin separation layer as evidenced by the observed high permeance (>100-GPU) and selectivity (>25) for propylene over propane after less than 1 minute of contact with aqueous silver nitrate at ambient (20 to 25° C.) temperature.

The thin-film composite membrane is highly useful for the separation of alkenes from alkanes, and separation of aromatic compounds such as benzene from other non-aromatic organic compounds such as alkanes that include cyclohexane. The membrane feed-side is exposed to a flowing feed mixture comprising an alkene or aromatic compound. The feed mixture may be gaseous or liquid, such as in a pervaporation process, and can contain water or water vapor to improve the separation. A "driving force" is provided in which the alkene or aromatic compound pressure on the membrane feed-side is higher than on the membrane permeate side. Selective permeation of the alkene or aromatic compound occurs within the membrane producing a mixture at the membrane permeate-side having a higher concentration of alkene or aromatic compound in the permeate mixture than the membrane feed-side. Separation may also be enhanced by having water present in the feed mixture and/or by using a sweep or vacuum on the membrane permeate-side to increase the driving force. A flowing sweep gas functions to reduce the overall permeate partial pressure or concentration. For example, a sweep gas may comprise an inert gas such as water vapor or nitrogen.

EXAMPLES

Example 1

Nafion® and Aquivion® Solution Preparation:

2%-w/w solutions were prepared by isopropanol dilution of commercially available Nafion® D2020 acid-form ionomer solutions (Ion Power, New Castle, Del.) and Aquivion® D72-25BS, D79-25BS, and D98-25BS solutions (Sigma-Aldrich, St. Louis, Mo.). The diluted solutions were filtered through a glass microfiber filter, having a porosity of approximately 1-µm, and characterized for concentration by gravimetric drying (5-g samples) to constant weight on a 110° C. hot plate. Nafion® ionomer had an equivalent weight) of approximately 930-g/mole and the Aquivion® ionomers had equivalent weights of 720, 790, and 980-g/mole, respectively.

Example 2

Silver Ionomer Solution Formation:

Separate quantities of each of the 2% acid-form ionomer solutions prepared in example 1 were converted to the silver-sulfonate ionomer solution by either equilibrium exchange with silver nitrate or by reaction with insoluble silver carbonate. Using silver nitrate, approximately 1 molar equivalent of silver nitrate to sulfonic-acid groups in the ionomer solution was dissolved with magnetic stirring. The solutions were subsequently filtered through 1-µm glass microfiber. Using silver carbonate, acid-form ionomer solutions were magnetically stirred for at least 15 minutes with a 10 to 25% molar excess of silver carbonate to sulfonic-acid groups. The solutions were subsequently filtered through 1-µm glass microfiber to remove excess insoluble salts, resulting in a solution that was substantially free of dissolved ionic species not associated with the silver-sulfonate ionomer. All silver-sulfonate ionomer solutions were stored away from light sources prior to and between uses.

Example 3

Reduced Viscosity of Sulfonic Acid and Silver-Sulfonate Ionomer Solutions:

Portions of the 2% acid-form ionomer (AFI) and silver-sulfonate ionomer solutions prepared in examples 1 and 2, respectively, were quantitatively diluted to 1% concentrations with isopropanol. Kinematic viscosities were measured using an Ubbelohde capillary viscometer (size 1) in a temperature controlled (25° C.) water bath. Solution densities (g/mL) were measured volumetrically and dynamic viscosities ($\eta$) were calculated from the product of density and kinematic viscosity for each solution and the isopropanol solvent ($\eta_{sol}$). The reduced viscosities, which are normalized for ionomer concentration (c) in grams per deciliter (g/dL), were calculated as: $\eta_{red}=(\eta/\eta_{sol}-1)/c$. The reduced viscosities are listed in Table 1 and are known from theory to correlate to the ionomer molecular size in solution. The results showed that the AFI solutions had the highest reduced viscosities and correspondingly largest molecular size in solution. Reduced viscosities for Aquivion® having 720 and 790 equivalent weights were higher than Nafion®. Reduced viscosities were lowest and approximately 3 times lower than the AFI solutions when other dissolved ionic species, herein nitric acid from exchange with silver nitrate, were also present in the solution.

TABLE 1

| Ionomer solution | Equivalent weight (g/mole) | Silver addition method | Reduced viscosity, $\eta_{red}$ (dL/g) |
|---|---|---|---|
| Aquivion® AFI | 720 | n/a | 1.37 |
| Aquivion® | 720 | carbonate | 0.620 |
| Aquivion® | 720 | nitrate | 0.513 |
| Aquivion® | 790 | carbonate | 0.579 |
| Aquivion® | 980 | carbonate | 0.180 |
| Nafion® AFI | 930 | n/a | 0.921 |
| Nafion® | 930 | carbonate | 0.446 |
| Nafion® | 930 | nitrate | 0.276 |

Example 4

Thin-Film Composite Membrane Fabrication on Substrate Comprising a Porous-Layer Support:

A 120-cm×45-cm sheet of polyvinylidine fluoride (PVDF) porous-layer support, having a 0.02-µm mean porosity, 40-µm thickness, and supported on a non-woven polyester backing, was prepared for casting. The PVDF sheet was tacked down at the edges on a flat and level glass surface that was contained in a ventilated enclosure. A 35-cm×#30 Meyer rod with an attached reservoir trough was placed at one end of the PVDF. The trough was filled with up to 60-mL of a selected acid-form ionomer solution from example 1 or silver sulfonate ionomer solution from example 2. The Meyer rod was then slowly drawn down the PVDF support at a rate sufficient to maintain a small solution-front ahead of the rod. The membrane was dried undisturbed on the casting surface at ambient temperature for at least one hour to overnight. Selected membranes were heat treated "annealed" to strengthen the separation layer as described further herein. Most of the dry membrane area was used for spiral module fabrication. The remaining membrane area was tested for initial helium permeability while some membrane samples were also tested for initial separation performance of alkenes, alkanes, and aromatic compounds as described further herein.

Example 5

Estimation of Separation Layer Thickness:

The separation layer thickness was estimated from the "wet" solution film weight, the ionomer solution concentration ([ionomer %]), the wet-film area, and the ionomer density (p). Nafion® has a literature reported density of 1.97-g/cm³ while Aquivion® has a reported density of 2.06-g/cm³. The separation layer thicknesses were calculated using the following equation (1) and were less than 2-µm with most approximately 1-µm.

$$\text{GSL thickness } (\mu m) = \frac{\text{wet film (g)} \times [\text{ionomer \%}] \times 100}{\rho(g/cm^3) \times \text{wet film area } (cm^2)} \quad (1)$$

Example 6

Simulated Spiral Module Fabrication:

A 30-cm×100-cm piece of a thin-film composite membrane prepared in example 4 was folded in half with the separation layer facing inwards. A 30-cm×50-cm polypropylene-mesh feed spacer was then inserted between the two separation layer surfaces. Separately, the short side of a 30-cm×80-cm polypropylene-mesh permeate spacer was aligned to a 30-cm L×1.5-cm diameter perforated-core tube. The folded membrane with feed spacer was then aligned length-wise on top of the permeate spacer with the folded end nearest the core tube. The membrane and spacers were then tightly wound together without glue and under tension around the core tube to form the spiral module. The outside diameter was then wrapped with tape to hold the module together. After several hours, the tape was removed, and the module was unwound to isolate the membrane for further testing.

Example 7

Helium Permeability Measurement:

Permeability measurements of most permanent gases such as helium, propylene, propane, ethylene, and nitrogen were made using a constant pressure with variable volume technique. Therein, 47-mm diameter membrane samples were randomly punched from a given membrane. For the initial "as made" membranes of example 4, five separate samples were tested for helium while twelve separate samples from a spiral module membrane of example 6 were tested. The sample membranes having a 13.85-cm² active area (A) were sealed in a stainless-steel cross-flow cell having feed/retentate and sweep/permeate ports. The membrane was oriented so that the separation layer faced the feed/retentate. The sweep port was blocked off for the helium measurement and the retentate outlet was connected to a rotameter with needle valve for flowrate control. The permeate flowrate ($F_P$) was measured using an Agilent ADM1000 acoustic flowmeter. Helium was supplied to the feed inlet at pressures (P) of 30 and 60-psig and the retentate outlet flowrate was approximately 125 or 250-mL/min, respectively. Membrane samples were equilibrated for at least 1 minute at a given pressure before recording the permeate flowrate. The helium permeability, corrected for temperature (K) to STP conditions, was calculated, using the estimated gas-separation layer thickness (T), from the following equation (2):

$$\text{Permeability (Barrer)} = 0.96 \times 10^6 \times \frac{F_P(\text{mL min}^{-1}) \times T(\mu m)}{P(psig) \times A(cm^2) \times K \text{ (Kelvin)}} \quad (2)$$

Example 8

Figure 1:
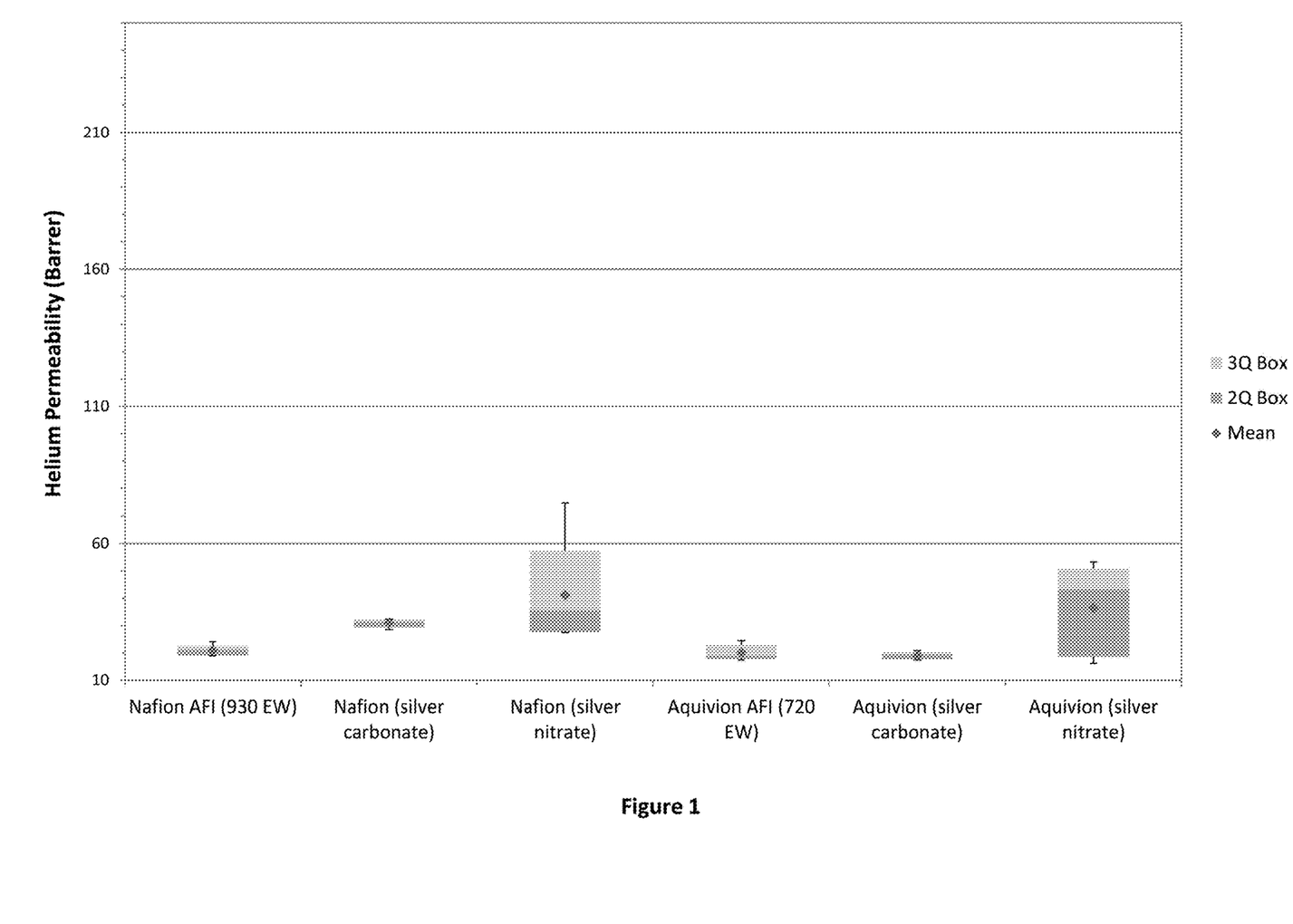
FIG. 1 shows a box and whisker plot of helium permeability for the initial "as made" thin-film composite membranes.

Thin-Film Composite Membrane Initial Helium Permeability:

Table 2 summarizes initial mean helium permeability and standard deviations for the separation layers of membranes from either Nafion® or Aquivion® and certain respective silver-sulfonate ionomers. Separation layers from acid-form ionomers (AFI) at 20.1, and 20.9, respectively, were in good agreement within standard deviations for the previously identified literature values of 18 to 22 Barrers. The excessively high permeability for Aquivion® having a 980 equivalent weight was likely due to a relatively low reduced viscosity and corresponding low ionomer molecular size in solution as received, which resulted in incomplete pore bridging and an overall weaker separation layer during film coalescence. Furthermore, FIG. 1 shows a box and whisker plot of helium permeability distributions for Nafion® and Aquivion® (720 equivalent weight) membrane samples. Therein, the 2Q and 3Q boxes represent the $2^{nd}$ and $3^{rd}$ quartile ranges, respectively, for the statistically calculated distributions, while the positive and negative whiskers represent the data range about the mean. Permeability distributions were relatively narrow for separation layers from acid-form and silver-sulfonate (from silver carbonate) ionomers. The mean permeability agreement with literature precedent indicated that these membranes were predominantly laminar and their narrow distributions indicated that they were largely free of defects. In contrast, the mean permeability was notably higher and distributions much broader as a result of a higher defect rate for separation layers formed from solutions that were mixtures of the acid-form ionomer and silver nitrate.

TABLE 2

| Separation Layer Construction | Equivalent Weight (g/mole) | Mean Helium Permeability (Barrer) | Permeability Standard Deviation (Barrer) |
|---|---|---|---|
| Nafion ® AFI | 930 | 21 | 2 |
| Nafion ® (silver carbonate) | 930 | 31 | 2 |
| Nafion ® (silver nitrate) | 930 | 41 | 20 |
| Aquivion ® AFI | 720 | 20 | 3 |
| Aquivion ® (silver carbonate) | 720 | 19 | 1 |
| Aquivion ® (silver nitrate) | 720 | 36 | 17 |
| Aquivion ® (silver carbonate) | 790 | 18 | 1 |
| Aquivion ® (silver carbonate) | 980 | 233 | 64 |

Example 9

Figure 2:
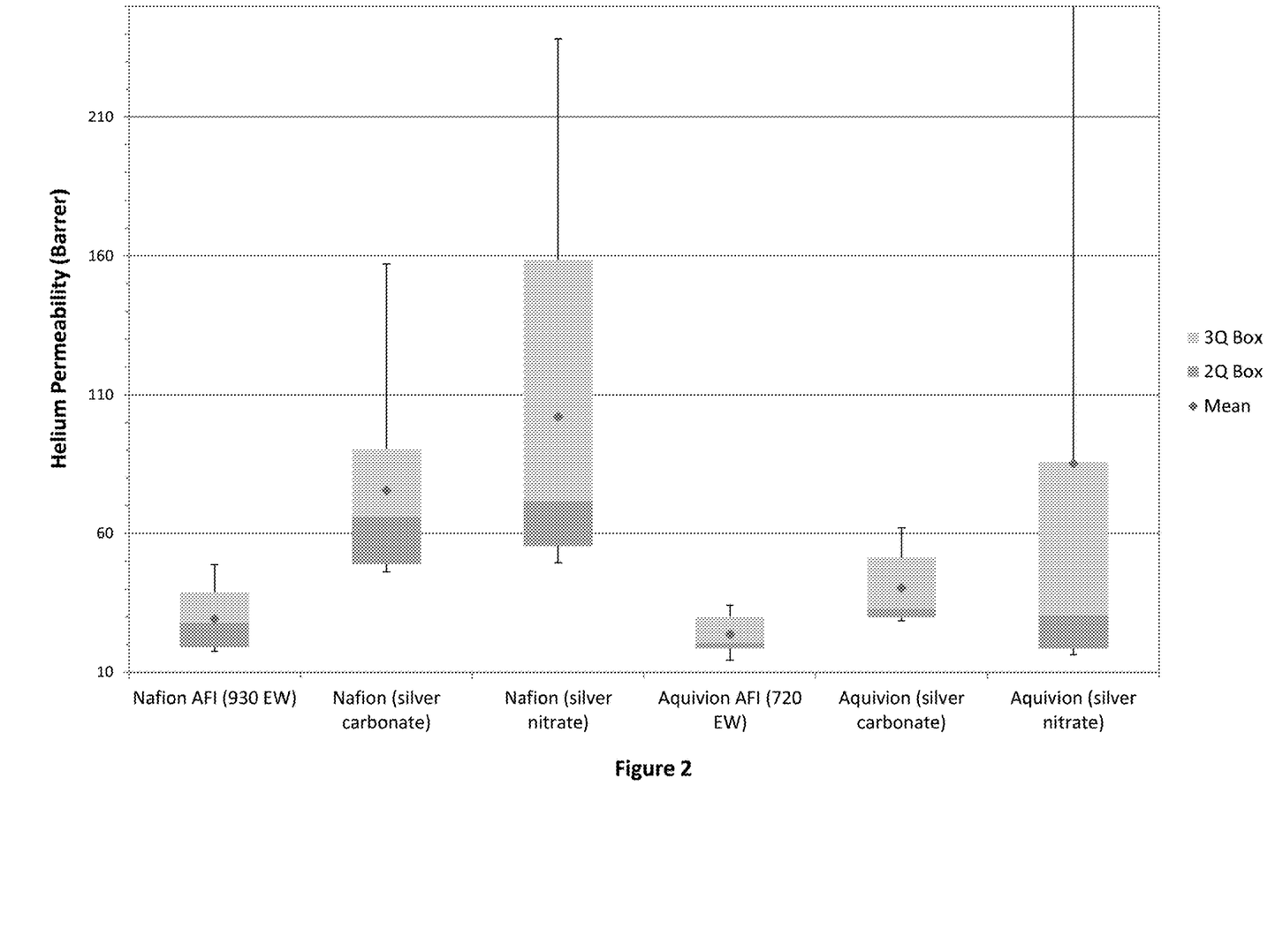
FIG. 2 shows a box and whisker plot of helium permeability for the thin-film composite membranes after spiral module fabrication.

Spiral Membrane Helium Permeability:

FIG. 2 shows a box and whisker plot for the membrane permeability distributions after spiral module fabrication using Nafion® and Aquivion® (720 EW). The mean helium permeability had increased for all membranes after spiral manufacture and appeared to be inversely correlated with the ionomer solution reduced viscosity. Permeability distributions for all acid-form (AFI) and the Aquivion® (silver-carbonate) ionomer separation layers remained relatively narrow and indicated that these were still predominantly defect-free after spiral fabrication. However, the helium-permeability statistical distributions were significantly broader for separation layers fabricated from solutions that were mixtures with soluble silver nitrate, wherein the ionomer intrinsic viscosity was lowest. These gas-separation layers were compromised such that the membrane may be considered as failed when used in a spiral module and will not have a sufficient and commercially viable selectivity for separations of alkenes.

Example 10

Alkene Permeance and Selectivity Over Alkane Measurement:

47-mm dia. thin-film composite membrane samples were punched from a larger membrane area. A membrane sample having a 13.85-cm² active area (A) was placed in the stainless-steel cross-flow cell as described in example 8. The cell was placed in a well-ventilated testing apparatus and gas lines were connected to the various ports. The feed comprised a gaseous mixture of an alkene (polymer grade ethylene or propylene, 99.5%) and an alkane (propane, 99.9%) or a mixture of the alkene and nitrogen. Each gas was supplied from separate cylinders, fed through separate mass flow controllers, and then mixed. Standard feed compositions were 20-mol % alkene with 80-mol % alkane or 50% alkene with 50% nitrogen at a total mass flow rate of approximately 200-ml/min. The mixtures were passed through a water bubbler to humidify the gas to greater than 90% relative humidity. A back-pressure regulator on the retentate line was used to control the feed pressure in the cell. The retentate gas was safely vented after exiting the back-pressure regulator. The total feed pressure ($p_F$) was normally 75 psia and alkene, alkane, or nitrogen partial pressures ($p_{Fi}$) in the feed were calculated from the total feed pressure and their respective mass (molar) flow rates ($m_{Fi}$) using equation (3) as follows.

$$P_{Fi} = P_F \times \frac{m_{Fi}}{\Sigma m_{Fi}} \quad (3)$$

Permeance measurements were carried out at ambient temperature and most were made without a permeate sweep gas. With a sweep, dry nitrogen was fed through a mass flow controller at 300-mL/min and then passed through a water bubbler to humidify the stream to greater than 90% relative humidity. A sweep volumetric flow rate ($F_S$) (nitrogen+water vapor) was measured near the sweep inlet. Permeate (and sweep) gases exited at the permeate outlet where the total volumetric flowrate ($F_P$) was measured. The permeate-gas volumetric-flow rate ($f_P$) was calculated as a difference of total flow rate at the permeate outlet and sweep-in flow rate ($f_P = F_P - F_S$). Without a sweep, $f_P$ was measured directly at the permeate outlet. The permeate pressure ($p_P$) was typically between 15 and 16.5-psia. A Varian® 450 gas chromatograph (GC) with a GS-GasPro capillary column (30 m×0.32 mm) was used to measure the fraction ($c_i$) of alkene and alkane (and nitrogen) in the permeate. The corresponding permeate-component flow rates were: $f_{Pi}=f_P \times c_i$; and permeate-component partial pressures ($p_{Pi}$) were calculated using equation (4) as follows:

$$p_{Pi} = p_P \times \frac{f_{Pi}}{f_P} \quad (4)$$

The component flow rates were corrected to STP and the permeance of each component ($Q_i$) in gas permeance units (GPU=$10^{-6} \times$cm³/cm²/sec/cmHg) was calculated from equation (5):

$$Q_i(GPU) = \frac{f_{Pi}(STP)}{A \times (p_{Fi} - p_{Pi})} \quad (5)$$

The selectivity of the membrane for alkene over alkane or nitrogen for a specific feed composition was calculated as the permeance ratio of alkene to alkane or alkene to nitrogen.

Example 11

Thin-Film Composite Membrane Initial Separation of Propylene and Propane:

Multiple membrane samples having separation layers comprising Nafion® and Aquivion® were tested for initial separation of propylene from propane, as outlined in example 10 without a nitrogen sweep. Table 3 shows that membranes fabricated from ionomer solutions (silver carbonate), that were substantially free of other dissolved ionic species not associated with the ionomer, had propylene/propane selectivity that was approximately 40 or higher. The negligible propylene/propane selectivity for the 980 EW Aquivion® GSL was again likely due to a relatively low ionomer reduced viscosity, which resulted in incomplete pore bridging during separation layer formation. However, membranes from ionomer mixtures with silver nitrate also had low propylene selectivity that was less than 10 due to a higher defect rate. The higher defect rate is also believed to have resulted from a lower ionomer molecular size in solution as evidenced by lower reduced viscosity and also hindered and incomplete film coalesce resulting in a more fragile separation layer.

TABLE 3

| Gas-separation Layer Construction | Equivalent Weight (g/mole) | Propylene Permeance (GPU) | Propylene/Propane Selectivity |
| --- | --- | --- | --- |
| Nafion ® (silver carbonate) | 930 | 89 | 45 |
| Nafion ® (silver nitrate) | 930 | 130 | 7 |
| Aquivion ® (silver carbonate) | 720 | 152 | 39 |
| Aquivion ® (silver nitrate) | 720 | 290 | 3 |
| Aquivion ® (silver carbonate) | 790 | 102 | 43 |
| Aquivion ® (silver carbonate) | 980 | 248 | 1 |

Example 12

Separation Layer Activation by Silver Exchange and Propylene Permeance and Selectivity Over Propane:

The separation layer of initial membrane samples, fabricated from Aquivion® (720 EW) acid-form ionomer solution as described in example 2, were covered for different times with 0.5M aqueous silver nitrate and subsequently tested for propylene permeance and selectivity, as described in example 10, using a nitrogen sweep. A control was prepared in which the gas-separation layer was briefly contacted with cold de-ionized water only. High permeance (>100-GPU) and selectivity (>50) was observed for all TCMs that were contacted with silver nitrate as shown in Table 4 and demonstrated that a level of exchange sufficient for high alkene permeance and selectivity over alkane was achieved in less than one minute.

TABLE 4

| Contact Time (s) | Propylene GPU | Propylene Selectivity |
| --- | --- | --- |
| 1000 | 196 | 87 |
| 100 | 161 | 67 |
| 10 | 162 | 62 |
| ~1 to 2 | 179 | 78 |
| control | 23 | 5 |

Example 13

Silver Exchange of 720EW Aquivion® and 930EW Nafion® Separation Layers and Helium and Propylene Permeance and Selectivity Over Propane:

The separation layer of separate initial membrane samples fabricated from Aquivion® (720 EW) or Nafion® (930EW) acid-form ionomer solutions, as described in Example 2, were covered for 30 seconds with 0.14M aqueous silver nitrate and subsequently tested for helium permeability (example 7) and propylene permeance and selectivity over propane, (example 10 without a nitrogen sweep). Table 5 shows that average helium permeability and propylene/propane selectivity were similar to membranes prepared from a silver sulfonate (silver carbonate) ionomer in Examples 8 and 11.

TABLE 5

| Sample | Helium Permeability (Barrer) | Propylene Permeability (Barrer) | Propylene/Propane Selectivity |
| --- | --- | --- | --- |
| Aquivion ® | 29.6 | 214 | 22 |
| Aquivion ® | 15.7 | 175 | 58 |
| Aquivion ® | 22.9 | 204 | 32 |
| Aquivion ® | 20.7 | 208 | 40 |
| Average (SDev) | 22 (6) | 200 (17) | 38 (15) |
| Nafion ® | 18.9 | 68.2 | 48 |
| Nafion ® | 30.5 | 114 | 40 |
| Nafion ® | 23.3 | 93.8 | 61 |
| Nafion ® | 47.5 | 183 | 29 |
| Average (SDev) | 30 (13) | 115 (49) | 45 (13) |

Example 14

Aromatic Compound Permeance Measurement:

Permeance measurements for aromatic and other organic compounds that were mostly non-permanent gases such as benzene, toluene, xylene, cyclohexane, and pentane were made using a constant volume/variable pressure technique. Therein, a cylindrical test cell having a 3780-cm$^3$ volume ($V_c$) and a 45.6-cm$^2$ opening area (A) was constructed from a high-density polyethylene (HDPE) container. A membrane was sealed over the opening with the separation layer "feed side" facing the test cell volume. 5 to 10-µL of a selected compound was injected into the test cell through a septum port and allowed to completely evaporate into the test cell volume over 10 to 15 minutes. The membrane permeate-side was then loosely covered with an inverted funnel and the funnel stem was connected to a large air sweep (4-L/min) that could be humidified by passing the air through a water bubbler, ahead of the funnel. Gas samples (3.0-mL) were taken through the septum port and periodically analyzed by GC. GC peak areas of aromatic or other organic compound were proportional to their partial pressure ($P_{up}$) in the test cell. Permeance through the HDPE walls could not be detected and the corresponding partial pressure in the sweep ($P_{down}$) was assumed to be negligible (i.e. $P_{down} \ll P_{up}$). GC peak areas with time were modeled to an exponential decay to estimate a decay rate constant (k) and calculate permeance according to equation (6):

$$\text{Permeance } (GPU) = 10^6 \frac{V_c}{RTA \times (P_{up} - P_{down})} \times -\frac{dP}{dt} = 10^6 \frac{V_c k}{RTA}$$

where R is a gas constant (0.278 cm$^3$ cmHg/(cm$^3$ (STP) K), and T is the experimental temperature (Kelvin).

Example 15

Non-Permanent Gas Permeance Through a Silver-Sulfonate Separation Layer:

A sample of thin film-composite membrane comprising a separation layer of 720EW Aquivion® (silver carbonate), as described in example 4, was tested using the procedure described in example 14 under humidified and dry sweep conditions. Table 6 shows higher permeance of tested aromatic compounds compared to other organic (alkane) compounds.

TABLE 6

| Compound | Permeance (GPU) |
| --- | --- |
| Benzene | 200 |
| Benzene (dry) | <10 |
| Toluene | 175 |
| o-Xylene | 136 |
| p-Xylene | 207 |
| Pentene | 190 |
| Pentane | <10 |
| Cyclohexane | <10 |
| Cyclohexane (dry) | <10 |
| Propylene | 200 |
| Propane | <10 |

Example 16

Non-Permanent Gas Permeance Through a Lithium Sulfonate Separation Layer:

A thin film-composite membrane was prepared comprising a separation layer of 720EW Aquivion®, as described in example 4, from a lithium sulfonate solution (lithium carbonate), as generally described in example 2. The membrane was tested using the procedure described in example 14 under humidified and dry sweep conditions and Table x shows higher permeance of benzene under humidified conditions compared to cyclohexane.

TABLE 7

| Compound | Permeance (GPU) |
| --- | --- |
| Benzene | 160 |
| Benzene (dry) | 14 |
| Propylene | 20 |
| Cyclohexane | <10 |
| Cyclohexane (dry) | <10 |

Example 17

Non-Permanent Gas Permeance Through a Sulfonic Acid Separation Layer:

A thin film-composite membrane was prepared comprising a separation layer of 720EW Aquivion®, as described in example 4, from a sulfonic acid solution, as described in example 1. The membrane was tested using the procedure described in example 14 under humidified and dry sweep conditions and Table 8 shows higher permeance of benzene compared to cyclohexane.

TABLE 8

| Compound | Permeance (GPU) |
| --- | --- |
| Benzene | 190 |
| Benzene (dry) | <10 |
| Cyclohexane | <10 |
| Cyclohexane (dry) | <10 |

Example 18

Separation of Benzene/Cyclohexane by Pervaporation:

A sample of thin film-composite membrane comprising a separation layer of 720EW Aquivion® (silver carbonate), as described in example 4, was tested for pervaporation separation of benzene from cyclohexane. Therein, the membrane having a 13.85-cm² active area (A) were sealed in a modified stainless-steel cell having an approximately 100-mL feed reservoir that was heated and magnetically stirred. The membrane was oriented so that the separation layer faced the feed reservoir and the cell permeate-side had an inlet port for introduction of a crossflow nitrogen sweep (300 to 375-mL/min), that was pre-humidified, and an outlet port for permeate flow. 40-mL of a 1:1 feed mixture of benzene and cyclohexane and 10-mL of water was added to the cell reservoir. The cell was heated to the desired temperature and the humidified sweep was started. The permeate flow was periodically sampled and analyzed for composition by gas chromatography (GC). Table 9 summarizes benzene and cyclohexane permeance for the membrane at various elevated temperatures.

TABLE 9

| Temperature (° C.) | Permeance (GPU) | |
| --- | --- | --- |
| | Benzene | Cyclohexane |
| 40 | 27.1 | 0.78 |
| 60 | 25.5 | 0.72 |
| 80 | 26.4 | 0.80 |

What is claimed is:

1. A method of separating an aromatic compound from a mixture comprising an alkane using a thin-film composite membrane; the method comprising:
    a) providing a thin-film composite membrane having a feed side and a permeate side; the thin-film composite membrane comprising:
        i) a substrate comprising a porous-layer support; and
        ii) a separation layer comprising an ionomer comprising sulfonate groups, selected from: silver sulfonate, sulfonic acid, or non-silver sulfonate; said separation layer is predominantly laminar, in direct contact to said substrate, and substantially free of ionic species not associated with the ionomer;
    b) exposing the thin-film composite membrane to water or water vapor; and
    c) exposing the feed side to a flowing first mixture comprising an aromatic compound and an alkane; and
    d) providing a driving force and producing a flowing second mixture at the permeate side having a higher concentration of aromatic compound to alkane than the flowing first mixture at the feed side.

2. The method of claim 1 wherein the aromatic compound is selected from a group consisting of: benzene, toluene, or xylene.

3. The method of claim 1 wherein the flowing first mixture comprises an alkane selected from a group consisting of: ethane, propane, pentane, or cyclohexane.

4. The method of claim 1 wherein the cation of the non-silver sulfonate group is selected from: Li$^+$, Na$^+$, K$^+$, ammonium, alkyl ammonium, or mixtures therefrom.

5. The method of claim 1 wherein the ionomer is comprised of repeat units A and B in which A is a polymerized derivative of a fluorinated monomer and B comprises silver sulfonate groups.

6. The method of claim 5 wherein repeat unit A is selected from a group consisting of: tetrafluoroethylene, chlorotrifluoroethylene, trifluoroethylene, vinyl fluoride, or vinylidene fluoride.

7. The method of claim 5 wherein a precursor to the repeat unit B is a monomer of structure $CF_2\!\!=\!\!CFOR^fSO_2F$ wherein $R^f$ is a perfluoroalkylene group of 1 to 10 carbon atoms.

8. The method of claim 7, wherein the perfluoroalkylene group comprises ether oxygens.

9. The method of claim 1 wherein a precursor to the ionomer in the separation layer is a copolymer comprising tetrafluoroethylene and $CF_2$=$CFOCF_2CF_2SO_2F$.

10. The method of claim 1 wherein a precursor to the ionomer in the separation layer is a copolymer comprising tetrafluoroethylene and $CF_2$=$CFOCF_2CF(CF_3)OCF_2CF_2SO_2F$.

11. The method of claim 1 wherein the ionomer has an equivalent weight that is less than 800-grams/mole.

12. The method of claim 1 wherein the separation layer has a thickness that is less than 2-µm and is predominantly laminar wherein at least 50% of the gas-separation layer extends on top of the substrate comprising a porous-layer support and is not interpenetrating into the substrate comprising a porous-layer support.

* * * * *